(12) United States Patent
Liollio

(10) Patent No.: US 11,732,443 B2
(45) Date of Patent: Aug. 22, 2023

(54) CONSTRUCTION VEHICLE SAFETY MECHANISM

(71) Applicant: Zachary Paul Liollio, Charleston, SC (US)

(72) Inventor: Zachary Paul Liollio, Charleston, SC (US)

(*) Notice: Subject to any disclaimer, the term of this patent is extended or adjusted under 35 U.S.C. 154(b) by 77 days.

(21) Appl. No.: 17/443,580

(22) Filed: Jul. 27, 2021

(65) Prior Publication Data

US 2023/0030999 A1 Feb. 2, 2023

(51) Int. Cl.
*E02F 9/24* (2006.01)
*B60R 21/34* (2011.01)
*G08B 21/02* (2006.01)

(52) U.S. Cl.
CPC ............. *E02F 9/24* (2013.01); *B60R 21/34* (2013.01); *G08B 21/02* (2013.01)

(58) Field of Classification Search
CPC ........ E02F 9/24; B60R 21/34; B60R 21/0136; B60R 19/40; G08B 21/02; B60D 1/24; B60D 1/242; B60D 1/243
See application file for complete search history.

(56) References Cited

U.S. PATENT DOCUMENTS

| | | | | |
|---|---|---|---|---|
| 4,413,702 A * | 11/1983 | Schlanger | .............. | B62D 1/197 280/5.509 |
| 5,451,070 A * | 9/1995 | Lindsay | ................ | F16D 11/16 482/52 |
| 7,757,804 B1 * | 7/2010 | Li | ............................ | B60R 21/34 180/274 |
| 8,439,388 B1 * | 5/2013 | Westervelt | ............ | B60D 1/242 280/492 |
| 8,465,043 B1 * | 6/2013 | Buckert | ................ | B60D 1/243 280/507 |
| 9,045,881 B1 * | 6/2015 | Schlueter | ............. | E02F 9/0858 |
| 10,343,634 B1 * | 7/2019 | Fermer | .................. | B60R 19/38 |
| 2001/0024043 A1 * | 9/2001 | Breed | ................... | E01F 15/148 293/119 |
| 2008/0179901 A1 * | 7/2008 | Maus | ................... | B62D 63/061 293/132 |
| 2009/0295176 A1 * | 12/2009 | Matsubara | ............. | B60R 19/40 293/132 |
| 2015/0183395 A1 * | 7/2015 | Revankar | ............... | B60R 19/40 180/274 |
| 2015/0224949 A1 * | 8/2015 | Cuddihy | .............. | B60R 19/023 293/118 |

(Continued)

FOREIGN PATENT DOCUMENTS

EP 0949092 A1 * 10/1999
GB 2400712 A * 10/2004 ............... E02F 9/24

(Continued)

*Primary Examiner* — Karen Beck
(74) *Attorney, Agent, or Firm* — Nelson Mullins Riley & Scarborough LLP

(57) ABSTRACT

A safety mechanism for use on a vehicle is provided. The safety mechanism comprises a buffer and a sensor that is configured to send an electrical signal to processing circuitry in the vehicle when the sensor is activated. Sufficient movement of the buffer activates the sensor. A drive line may also be provided with the buffer connected to the drive line. Movement of the buffer may cause rotation of the drive line, and sufficient rotation of the drive line may activate the sensor.

20 Claims, 22 Drawing Sheets

(56) References Cited

U.S. PATENT DOCUMENTS

| | | |
|---|---|---|
| 2017/0060126 A1 | 3/2017 | Marsolek et al. |
| 2017/0113639 A1* | 4/2017 | Tsang ..................... B60R 19/42 |
| 2017/0197573 A1* | 7/2017 | Rastegar ............... B60R 19/205 |
| 2017/0247014 A1* | 8/2017 | Farooq ................... B60R 19/14 |
| 2018/0030672 A1 | 2/2018 | Marsolek et al. |
| 2019/0381961 A1* | 12/2019 | Farooq ................... B60R 19/38 |
| 2020/0050192 A1 | 2/2020 | O'Donnell et al. |
| 2020/0050197 A1 | 2/2020 | O'Donnell |
| 2020/0109527 A1 | 4/2020 | McAlpine et al. |
| 2020/0238773 A1* | 7/2020 | Francis ................... B60D 1/60 |
| 2020/0326713 A1 | 10/2020 | Spielman et al. |
| 2020/0332479 A1 | 10/2020 | O'Donnell |
| 2020/0353916 A1 | 11/2020 | Schwartz et al. |
| 2022/0044567 A1 | 2/2022 | Liollio |

FOREIGN PATENT DOCUMENTS

| | | | |
|---|---|---|---|
| JP | H0664489 | * | 7/1992 |
| JP | 2022142414 A | * | 9/2022 |
| KR | 960001547 | * | 3/1994 |

* cited by examiner

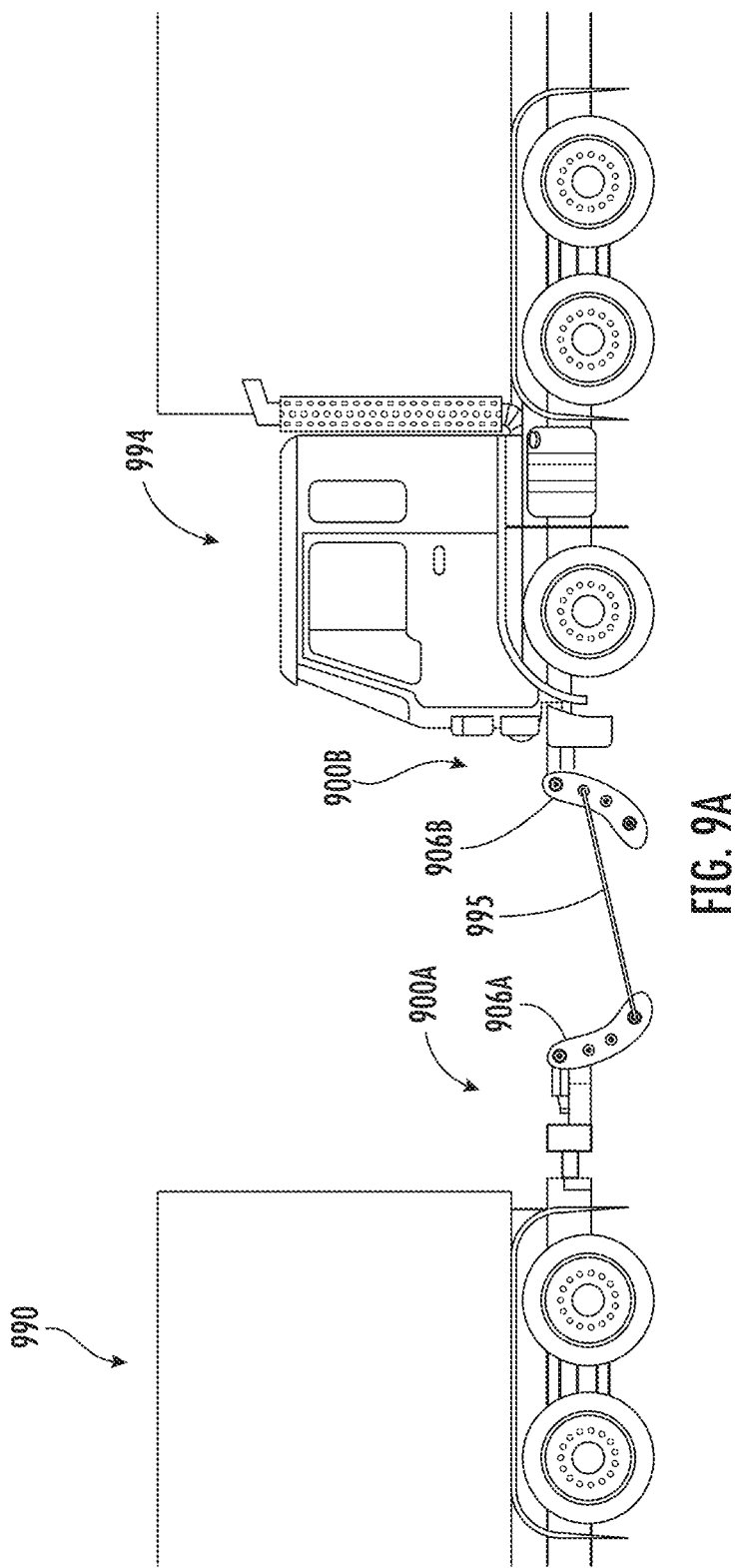

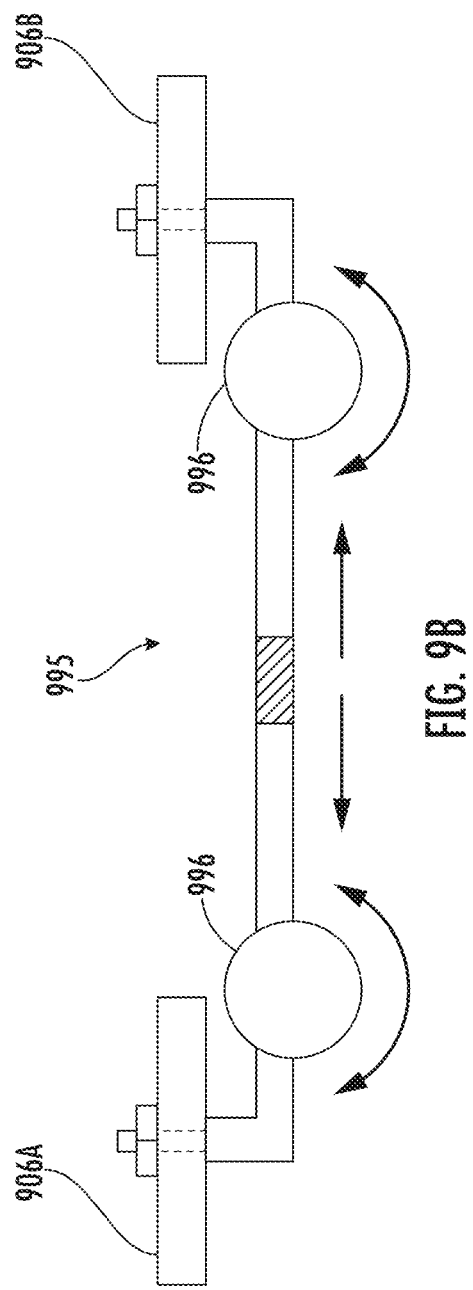

CONSTRUCTION VEHICLE SAFETY MECHANISM

FIELD OF THE INVENTION

Embodiments of present invention relate to a safety mechanism for use with various vehicles, including construction vehicles, such as dump trucks and vehicles in a paving train, waste collection vehicles, and transport vehicles, among others.

BACKGROUND

Accidents frequently occur with work vehicles. In 2011, according to the U.S. Bureau of Labor Statistics, 70 worker deaths occurred after backing incidents. Further, according to U.S. Department of Labor, Occupational Safety and Health Administration, more than 800 construction workers die every year while on the job in the United States. Being struck by vehicles, heavy equipment, and other objects is a top cause of injuries and the second cause of death for construction workers, killing more than 150 workers in 2009.

The line of sight for a driver may be obscured, preventing the driver from seeing individuals at or near the front or rear of the vehicle. Cameras and sensors may be used in attempt to reduce the chance of any accidents. However, these cameras and sensors often provide limited assistance in stormy conditions. Additionally, the cameras and sensors may have a shorter operating life and may require maintenance to keep them functioning properly—where a camera or sensor has broken or requires maintenance, accidents are more likely to happen. Further, the cameras and sensors may only detect individuals located within a small area, and the cameras and sensors may struggle to detect individuals outside this area.

Additionally, speakers may be used to sound an alarm when the vehicle is moving. Even with these alarms, deaths and injuries still occur as individuals at or near the front or rear of the vehicle may be unable to hear the alarms.

SUMMARY

Embodiments of present invention relate to a safety mechanism for use with various vehicles. The safety mechanism may serve as a "last line of defense" against certain types of injuries to people near work vehicles, and the safety mechanism may also protect against damage to vehicles and other equipment. Even when a person or object is out of view or when sensors and cameras become obscured by mud, dust, etc., the safety mechanism may facilitate safe operation.

In some embodiments, a safety mechanism can be mounted to a hopper and/or supply vehicle. The safety mechanisms may prevent objects/persons from coming directly in front of, behind, or beside a vehicle, depending on the location on the vehicle at which the safety mechanisms are disposed. A treadle may be provided and coupled with one or more buffers. The buffers may be disposed at the extreme ends of the safety mechanism along the width of the safety mechanism, and the buffers may be flexible and soften any impact of an individual or object coming into contact with the safety mechanism. The treadle may also extend along the width of the safety mechanism to prevent individuals or objects from coming directly in front of, behind, or beside the vehicle, and the treadle may be flexible or semi-rigid in some embodiments.

If an individual or object becomes trapped in front of, behind, or beside a vehicle, the buffer(s) and/or the treadle(s) may be pushed or pulled, directly or indirectly, including by the individual or object, or another person. This may send a stop signal to the vehicle on which the safety mechanism is installed and, in some cases, may also cause the vehicle's brakes to be applied or perform another action, such as causing a program running on an autonomous vehicle to stop (e.g., an unloading program). The safety mechanism may also send or cause an alert to be sent to a driver, site manager, or the like.

In various embodiments, the safety mechanism may also be used on a vehicle that is being driven in a semi-automated or automated manner. The safety mechanism may be provided along one or more sides of vehicle and may be used to provide a "hard stop" in the event that the vehicle approaches another object or surface. For example, where the vehicle approaches a parking curb or loading dock, the safety mechanism may come into contact with the parking curb or loading dock and the brakes of the vehicle may be activated. The safety mechanism can therefore increase the safety of autonomous or semi-autonomous vehicles and reduce the amount of damage caused to the vehicle itself. Safety mechanisms also can assist with cushioning other vehicles in an impact accident.

According to one embodiment, the present invention provides a safety mechanism for use with a vehicle. The safety mechanism comprises a tongue configured for connection to the vehicle and a drive line coupled with the tongue. The drive line defines a longitudinal axis. A sensor is coupled with the drive line and is configured for electrical communication with a braking system of the vehicle. At least one buffer is attached to the drive line.

According to yet another embodiment, the present invention provides a safety mechanism for use with a vehicle. The safety mechanism comprises a drive line configured for connection to the vehicle, the drive line having a first longitudinal axis. The drive line comprises at least one sensor, and the at least one sensor is configured to output a stop signal in response to rotation of the drive line about the first longitudinal axis. A pair of buffers are disposed on opposite ends of the drive line. A treadle extends between the pair of buffers. The treadle defines a second longitudinal axis, and the first and second longitudinal axes are substantially parallel.

In a further embodiment, the present invention provides a safety mechanism for use with a vehicle. The safety mechanism comprises a tongue configured for connection to the vehicle and a drive line coupled with the tongue. The drive line defines a longitudinal axis. The drive line comprises at least one gear in operative engagement with a cam. The cam is movable in response to rotation of the drive line about the longitudinal axis. At least one buffer is coupled with the drive line.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 9A illustrates a side view of a linkage bar that may be used in accordance with an embodiment of the invention;

FIG. 9B illustrates a top view of the linkage bar of FIG. 9A;

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention. Where the description herein states that two components are connected together, these components may be connected together either directly or indirectly unless stated otherwise below.

Figure 1A:
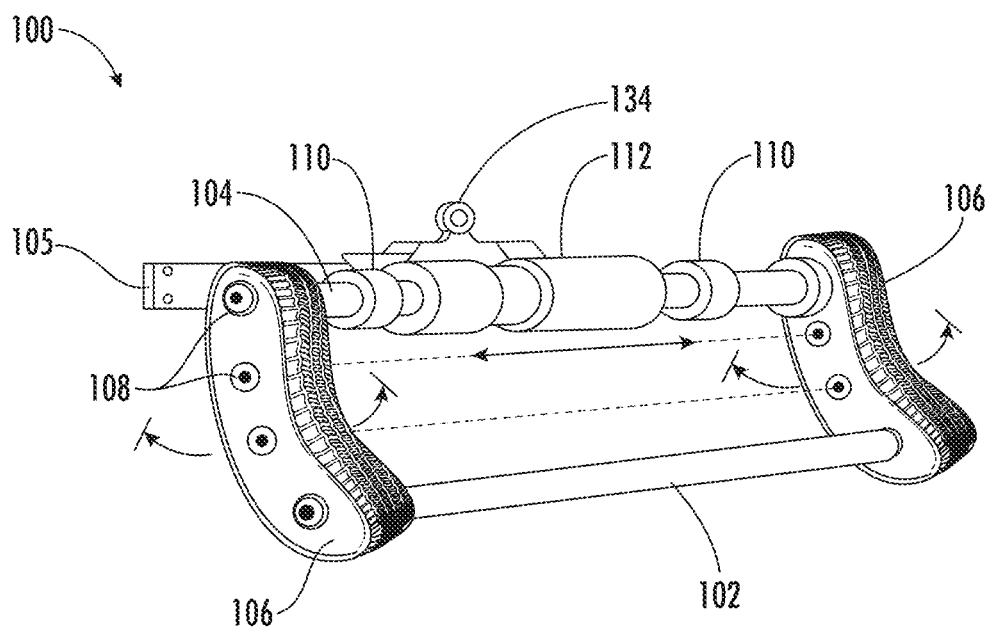
FIG. 1A illustrates a perspective view of a safety mechanism in accordance with an embodiment of the invention.
Figure 1B:
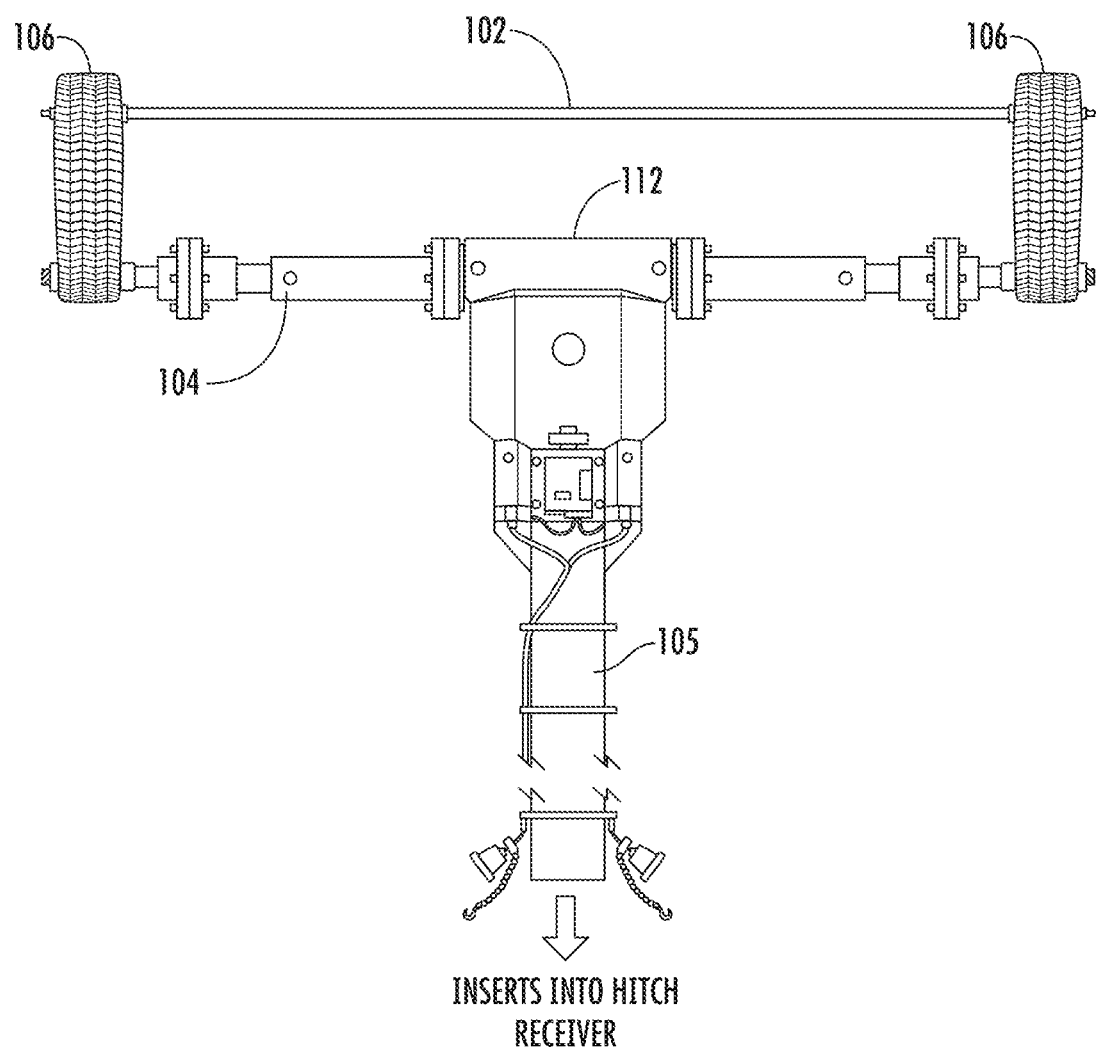
FIG. 1B illustrates a top view of a safety mechanism in accordance with an embodiment of the invention.

FIG. 1A illustrates a perspective view of a safety mechanism 100 in accordance with one embodiment. FIG. 1B also illustrates a top view of a similar safety mechanism 100. As illustrated, the safety mechanism 100 may have a treadle 102 and a drive line 104. The treadle 102 and the drive line 104 may be configured to run across the width of a vehicle (see, e.g., 290, FIG. 2A) in many embodiments, but the safety mechanism 100 may be oriented in a variety of ways and may have a variety of dimensions, as needed or desired. The treadle 102 and the drive line 104 may be shaped and/or bent, rather than linear, in various embodiments. In some embodiments, the treadle 102 and the drive line 104 may have one or more telescoping shafts, permitting the width of the treadle 102 and the drive line 104 to be varied to meet the needs of a particular application. The treadle 102 may permit a person to actuate the brakes even if their arms or clothing are ensnared. Additional treadles can be added, and the shape of the treadle may be modified. For example, the treadle may have a convex shape where the treadle extends outwardly to provide an expanded protection area.

One or more buffers 106 may also be provided. In some embodiments, these buffers may flexible or semi-rigid. However, different materials may be used to form the buffers 106, and the buffers 106 may be made rigid in some embodiments. In the embodiment shown, two buffers 106 are provided at opposite ends of the treadle 102 and the drive line 104. However, a different number of buffers 106 may be utilized in other embodiments, or the buffers 106 may be provided at other positions. Buffers 106 may define one or more holes 108 where the treadle 102 and the drive line 104 may be received and secured. In the embodiment illustrated in FIG. 1A, four holes 108 are included in each buffer 106. This permits a user to connect the treadle 102 or the drive line 104 in the desired hole 108, permitting the user to tailor the system to meet his or her particular needs. In some embodiments, a linear spring or a rotational spring may be included to resist rotation of the treadle 102 and/or the buffers 106 about the axis of drive line 104, and this may be done to prevent inadvertent braking. Holes 108 may comprise removable rungs in some embodiments that are fabricated with a hollow material to be more easily deformed by an impact to absorb impacting forces.

In various embodiments, several components may be provided on the drive line 104. For example, in the embodiment illustrated in FIG. 1A, protective rollers 110 and a worm gear are provided at the drive line 104. The protective rollers 110 may be added to protect the drive line 104 and the safety mechanism 100 from impacts or protruding pieces of equipment. The protective rollers 110 may comprise one or more bearings to reduce friction between the protective rollers 110 and the drive line 104.

A housing 112 may be provided to house the worm gear, a cam, and other electronics and devices. The worm gear 618 within the housing 112 (described further below in reference to FIG. 6E) may comprise teeth 613 that mesh with the teeth 681 of a rotating cam 680. The housing 112 protects the worm gear, the cam, and electronics from exterior conditions such as rain, humidity, mud, etc. Additionally, a tongue 105 may be provided that may be configured to connect the safety mechanism 100 to a vehicle or to another object. The tongue 105 may be inserted into a hitch receiver of the vehicle, for example. As can be seen in FIG. 1A, a lifting eye section 134 may be provided near the tongue 105 to assist in inserting the tongue 105 to a hitch receiver.

Figure 2A:
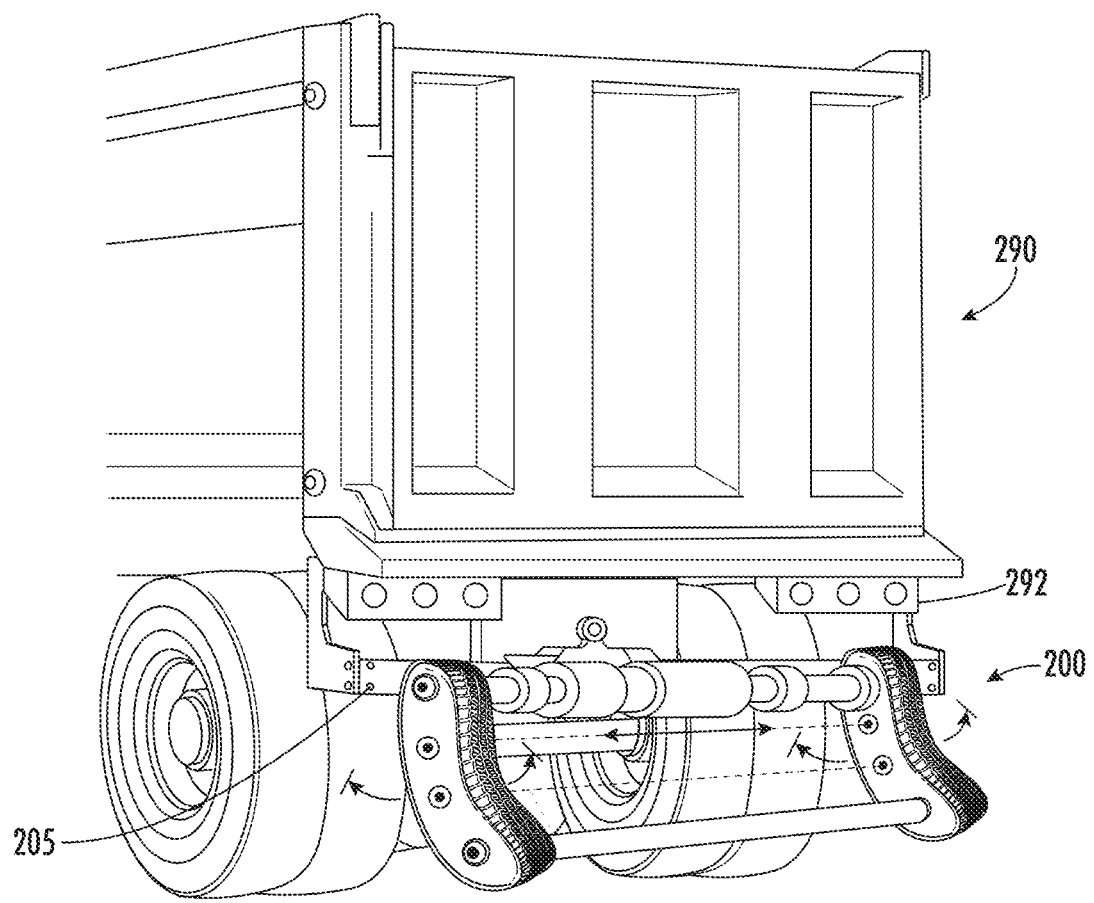
FIG. 2A illustrates a perspective view of a safety mechanism installed on a supply vehicle in accordance with an embodiment of the invention.
Figure 2B:
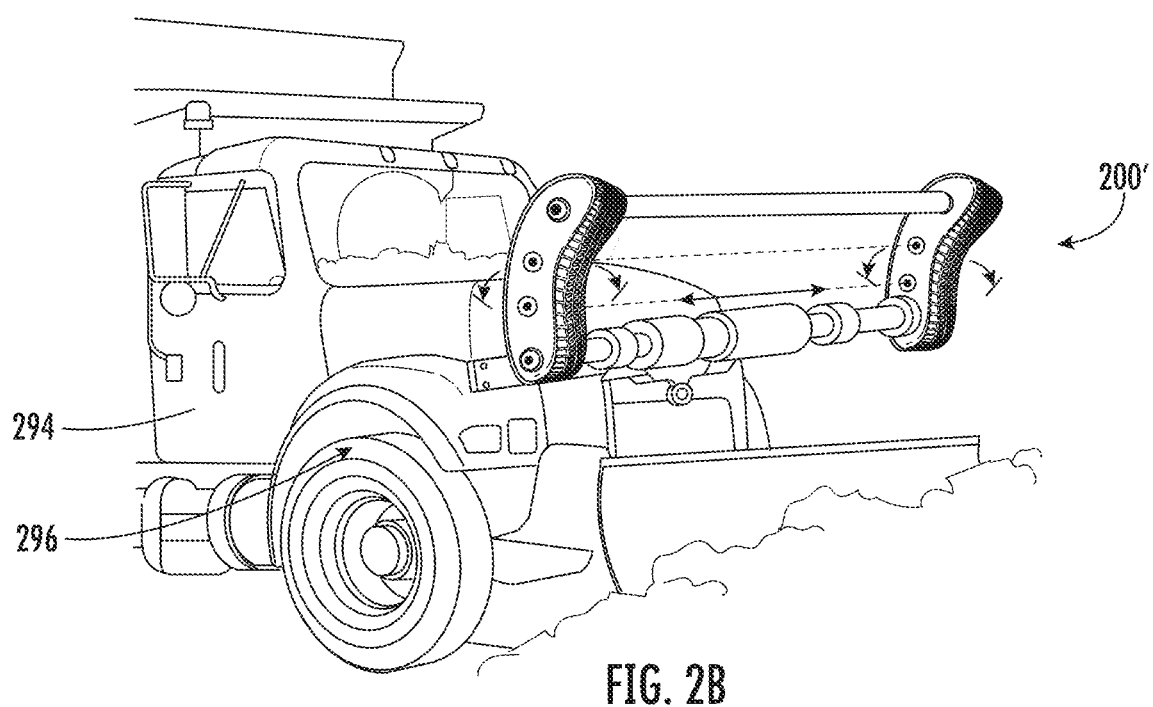
FIG. 2B illustrates a perspective view of a safety mechanism installed as a front mounted implement on a work vehicle in accordance with an embodiment of the invention.
Figure 2C:
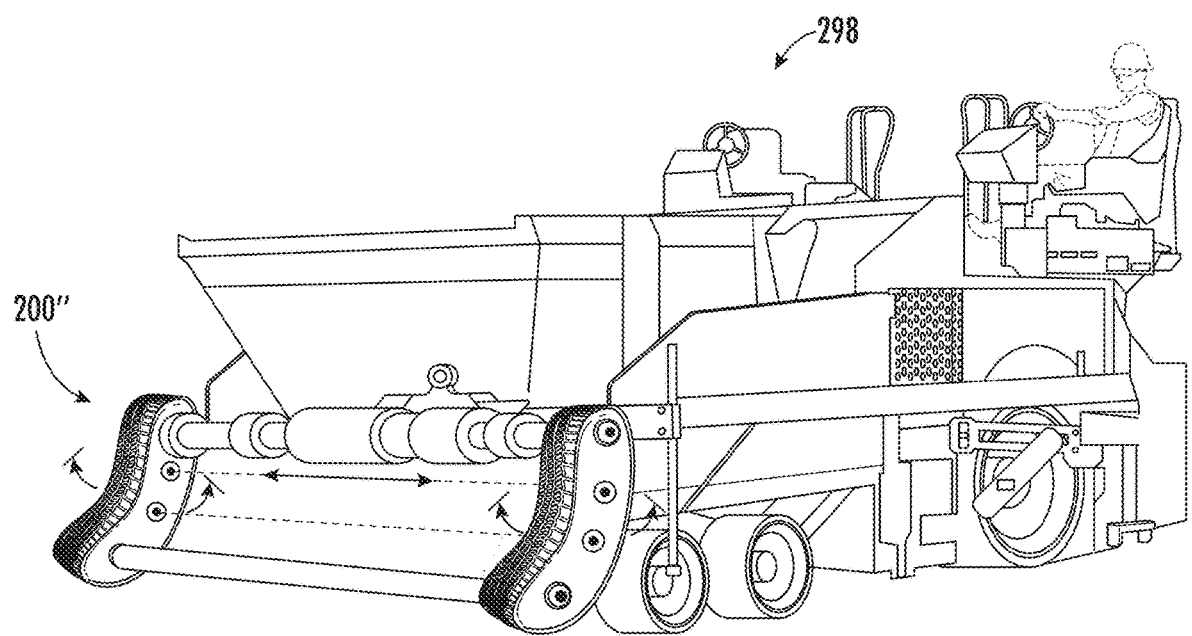
FIG. 2C illustrates a perspective view of a safety mechanism installed as a rear mounted implement on a hopper of a paving machine in accordance with an embodiment of the invention.

The safety mechanism may be mounted to various vehicles at many different positions on the vehicles. Examples are illustrated in FIGS. 2A-2C. In FIG. 2A, the safety mechanism 200 (which is similar to the safety mechanism 100 of FIG. 1A) is installed on the rear of a supply vehicle 290, such as a dump truck or asphalt transport truck. The safety mechanism 200 may be configured to be attached to a conventional trailer hitch receiver 292 as illustrated in FIG. 2A via the tongue 205.

FIG. 2B illustrates an embodiment of an inverted safety mechanism 200', installed on the front of a work vehicle 294, such as a snow plow, so that the inverted safety mechanism 200' may serve as a front mounted implement. The inverted safety mechanism 200' may be beneficial when a high risk is present that objects may fall downwardly onto the vehicle 294. For example, the inverted safety mechanism 200' may be beneficial for a snowplow truck or for other work vehicles where material from a road or work site may be elevated into the air and fall downwardly onto the vehicle. The inverted safety mechanism 200' may be installed in a manner so that it will not interfere with the line of sight of the driver. Where this inverted safety mechanism 200' is attached to a vehicle, the inverted safety mechanism 200' also may be rotated to a retracted position when not in use so that the inverted safety mechanism 200' will not interfere with the driver's line of sight.

In FIG. 2C, another safety mechanism 200" similar to the safety mechanism 100, 200 is used. This safety mechanism 200" is secured on a hopper of a paving machine 298 having a conventional trailer hitch receiver. However, the safety mechanism 100, 200, 200" and the inverted safety mechanism 200' may be placed at different locations in other embodiments, and the tongue 105, 205 may be configured to secure the safety mechanisms to vehicles or objects that do not utilize a conventional trailer hitch receiver 292 in some embodiments.

The safety mechanisms 100, 200, 200', 200" may provide an indication of when too much material is encumbering the safety mechanism. For example, as snow, ice, tree branches, etc. build on a safety mechanism, it will eventually trigger the safety mechanism. This may prevent the vehicle from advancing, preventing damage to the vehicle and reducing the chance that the vehicle may get stuck.

In some embodiments, the safety mechanism 200 will only activate, or become operative, when the speed of the vehicle is below a threshold speed such as 10 mph. Speeds below 10 mph are typical of supply vehicle unloading operations. By allowing operation of the safety mechanism 200 only at lower speeds, the safety mechanism 200 will not cause unnecessary braking as the vehicle 290 is driving to and from a work site. Even when a vehicle 290 is operating at a lower speed so that the safety mechanism 200 is activated, the brakes will only be applied after the treadle 102 (see FIG. 1A), the buffer 106, and/or the drive line 104 have been rotated by a predetermined amount.

Figure 3A:
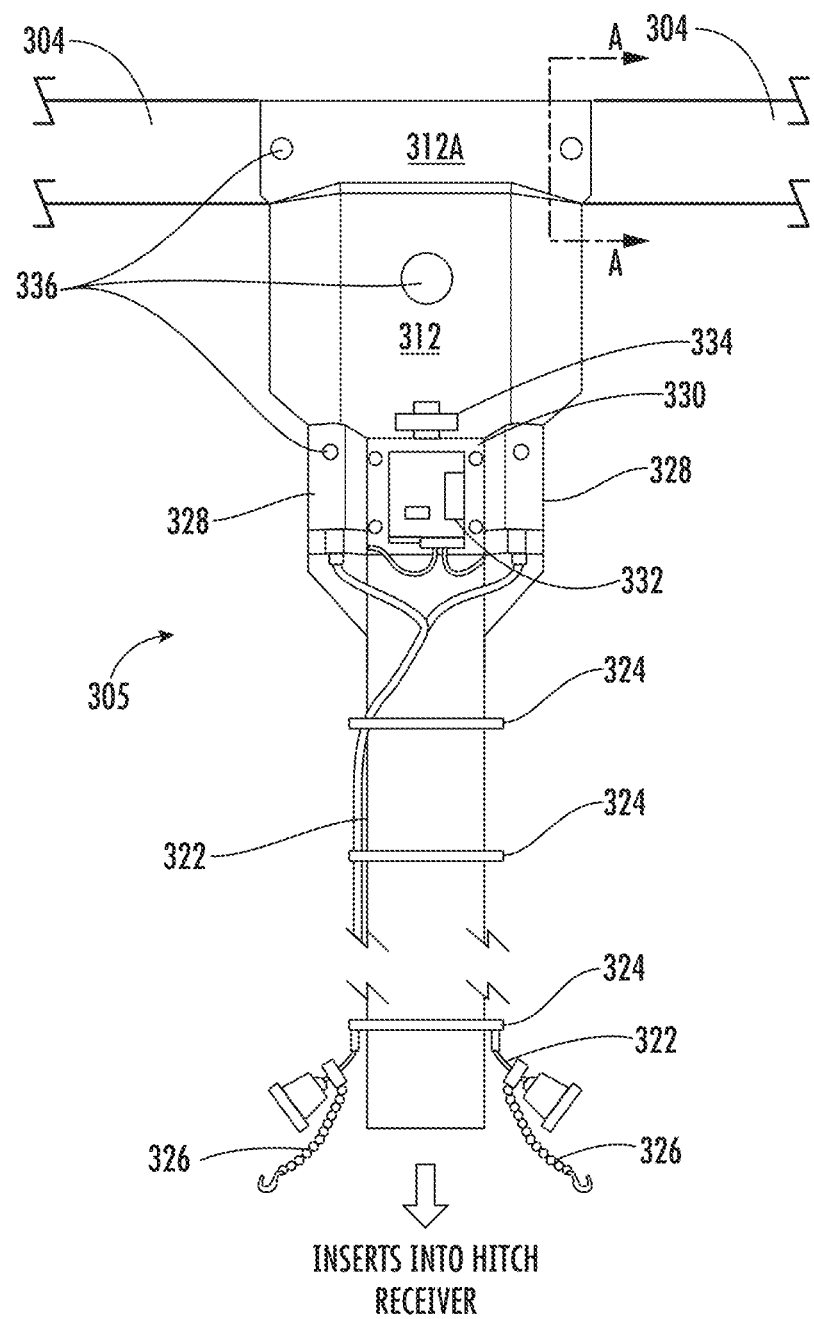
FIG. 3A illustrates a top view of a housing as well as a tongue that may be inserted to a hitch receiver of a vehicle in accordance with an embodiment of the invention.

FIG. 3A illustrates a portion of the tongue 305 and various components that may be provided thereon. A worm gear 618 (see FIG. 6C) may be provided inside the distal portion 312A of the housing 312. The worm gear 618 and the drive line 304 may be connected together via flanges so that rotation of the drive line 304 about its longitudinal axis will result in rotation of the worm gear 618. As will be discussed further below, the worm gear 618 may comprise teeth that may be configured to engage with corresponding teeth provided on a cam. The worm gear 618 may be permitted to rotate independently of the housing 312.

A housing 312 may also be provided. The housing 312 may be made from plate steel and may be disassembled to access internal components. The housing 312 may include a distal portion 312A, and the worm gear 618 and a cam 880 (see FIG. 8A) may be installed within the housing 312. The housing 312 may be provided with a mount for a GPS unit 1007, a GPS speed relay 1009, and a manual toggle switch 1005 (see FIGS. 10A, 10C) at internal portions of the housing 312. The housing 312 may protect these components from the outside environment in some embodiments. The housing 312 may also provide electrical insulation for the mechanical and electrical components inside the housing 312, and this may be done using gaskets and/or washers that may be made of rubber or plastic material in some embodiments. This allows the tongue 305 to be directly welded on and modified for holding aftermarket attachments, such as a rear facing camera, without the electrical current from welding passing through the electronics and components of the safety mechanism.

One or more cables 322 may also be provided that extend to the housing 312. The housing 312 may also include one or more removable covers 328. In the embodiment illustrated in FIG. 3A, two removable covers 328 are provided, and contact switch units are provided inside the removable covers 328. The removable covers 328 may beneficially protect the contact switch units 770 (see FIG. 7A) during normal operation and may be removed so that the contact switch units 770 may be quickly investigated when necessary.

A GPS unit may also be mounted in the housing 312 at the mount 330. A toggle button 332 may be provided on the housing 312. This toggle button 322 may allow a user to manually toggle input power to the electronics within the housing 312. Other toggle buttons may also be provided. Insulated grease fittings 336 may also be provided at various positions on the housing 312 so that grease may be provided at the worm gear 618 (see FIG. 6C), the contact switch units 770 (see FIG. 7A), and the cam 880 (see FIG. 8A).

Figure 3B:
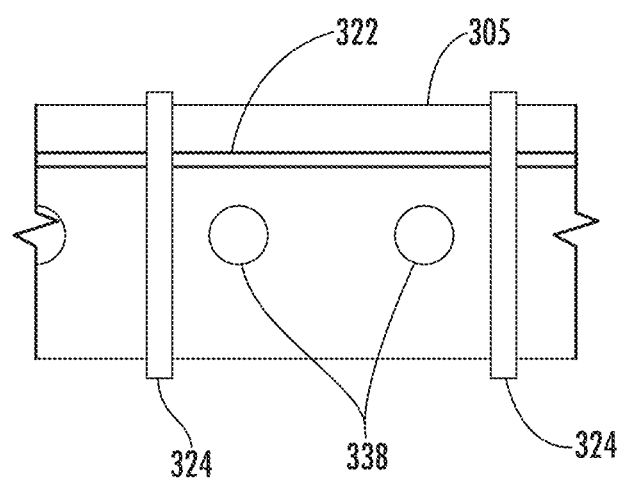
FIG. 3B illustrates a partial side view of the tongue of FIG. 3A.

In the embodiment illustrated in FIG. 3A, the tongue 305 is a hollow member and is a hollow structural shape (HSS) steel tongue with a recess (see FIG. 4B, 407) defined within the center of the tongue 305. Where the tongue 305 is a hollow member, the cables(s) 322 may instead be retained within the recess defined within the center of the tongue 305. In this way, the cable(s) may be protected from exterior conditions such as rain, humidity, mud, etc. In some embodiments, the tongue 305 may be a solid member that does not have a hollow center, and the cable(s) 322 may be provided along the exterior of a tongue 305. The cable(s) 322 may be retained in the desired position using one or more zip ties 324 and/or one or more retention chains 326, but other approaches may be used to retain the cable(s) 322 in the desired position. In some embodiments, the tongue 305 may be a telescoping shaft that is configured to have an adjustable length. As illustrated in the side view of FIG. 3B, the tongue 305 may have one or more holes 338 that are pre-drilled and that are for adjusting the length that the tongue 305 protrudes. A cotter pin or another suitable mechanism may be used to hold the tongue 305 in the desired position.

A lifting eye section 334 may also be provided on the housing 312 and/or the tongue 305. The lifting eye section 334 may be used to move the tongue 305 into a hitch receiver during installation. The lifting eye section 334 may be through-bolted through the housing 312, and this may help provide additional structural support for the tongue 305 and the housing 312.

Figure 4A:
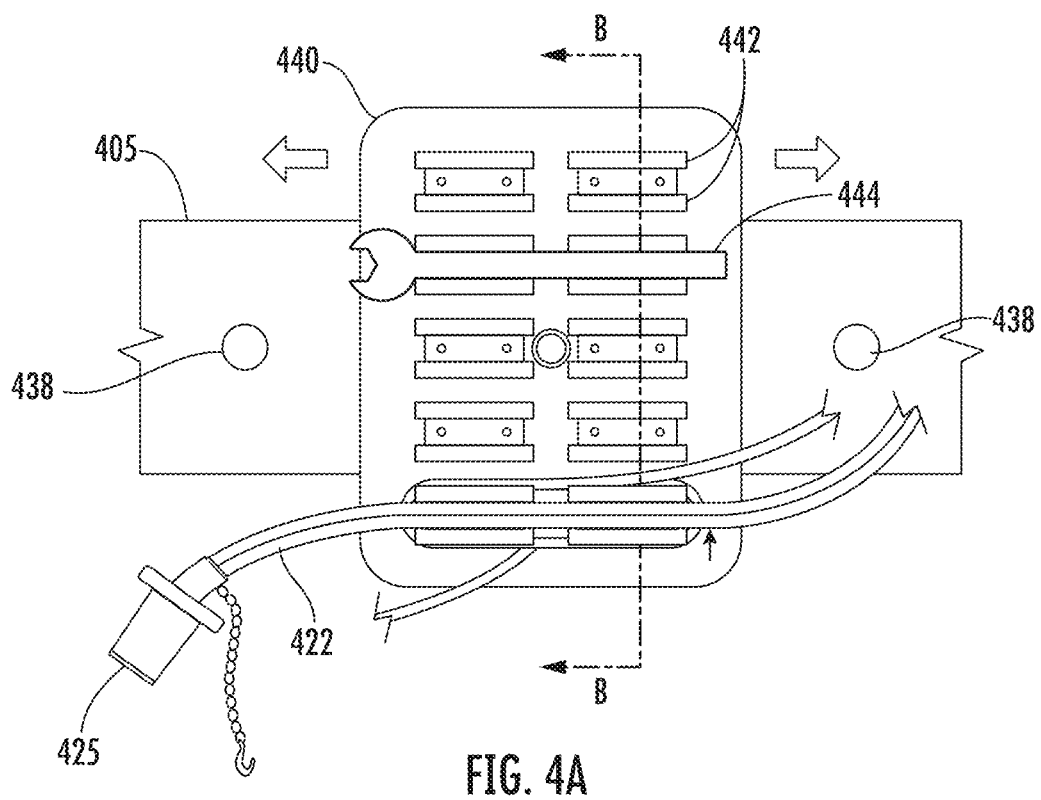
FIG. 4A illustrates a side view of a raceway disposed on the tongue in accordance with an embodiment of the invention.
Figure 4B:
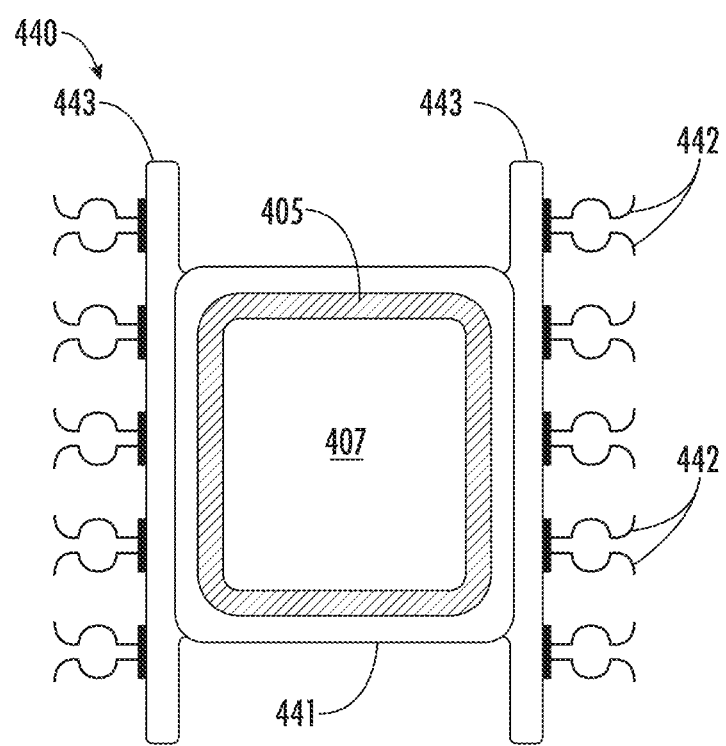
FIG. 4B illustrates a sectional view of the raceway illustrated in FIG. 4A about the sectional line B-B.

FIG. 4A illustrates a side view of a raceway 440 disposed on a tongue 405, and FIG. 4B illustrates a sectional view of a raceway 440 disposed on the tongue 405 about the sectional line B-B illustrated in FIG. 4A. The raceway 440 may be added and removed from the tongue 405 by a user as desired. The raceway 440 may be secured into slots 438 within the tongue 405 using fasteners in some embodiments. However, in some embodiments, the raceway 440 may be permitted to slide freely along the tongue 405.

The raceway 440 may be used to hold cables 422 and other equipment. The raceway 440 has clips 442 that may be used to organize and hold cables 422, and the clips 442 may be spring clips in some embodiments. These cables 422 may comprise a plug 425 for easy connection with other devices. Additionally, the clips 442 may be made of steel in some embodiments, but other materials may also be used. The raceway 440 can also accommodate new add-ons. The clips 442 can likewise secure specialty tools 444 such as the correct size Allen wrenches or adjustable wrenches.

As illustrated in FIG. 4B, the raceway 440 may comprise plates 443 where the clips 442 may be secured. The raceway 440 may comprise a carriage 441 that is integrally connected to the plates 443, and the carriage 441 may possess a hollow shape so that it defines an internal recess. Consequently, the tongue 405 may be received within the internal recess of the carriage 441. The tongue 405 may also possess a hollow shape and may define an internal recess 407 as illustrated in FIG. 4B.

The raceway 440 and the carriage 441 of the raceway 440 may comprise hard plastic, rubber, and/or fiberglass material in some embodiments. The raceway 440 and the carriage 441 of the raceway 440 may also comprise material that is non-conductive, with the raceway 440 and the carriage 441 being entirely non-conductive in some embodiments.

Figure 5A:
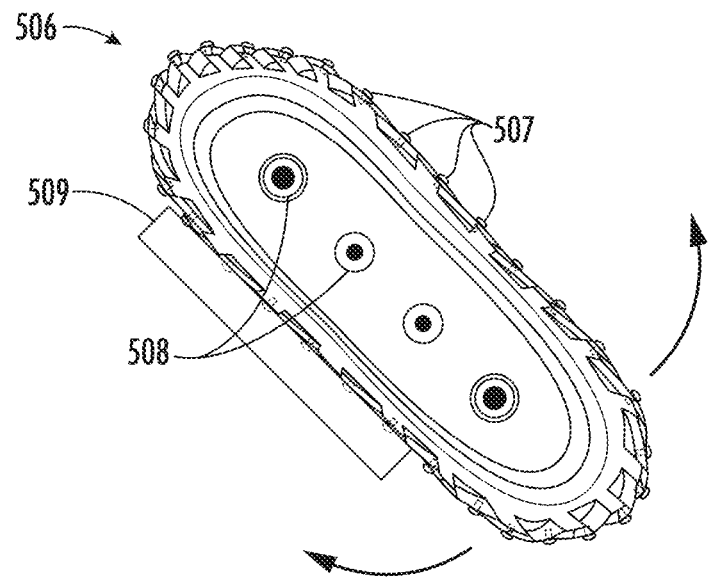
FIG. 5A illustrates a side view of a buffer in accordance with an embodiment of the invention.
Figure 5B:
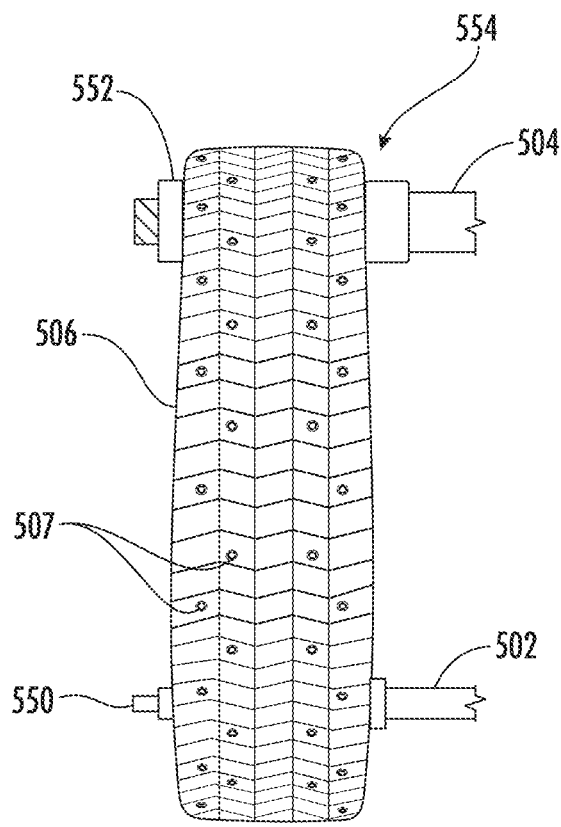
FIG. 5B illustrates rear view of the buffer of FIG. 5A.

As stated above, one or more buffers may be used in various embodiments of the invention. These buffers may assist in connecting the treadle 102 (see FIG. 1A) to the drive line 104 (see FIG. 1A). The buffers may assist in triggering the brakes of a vehicle on which the safety mechanism is deployed or in triggering some other action to occur. FIGS. 5A-5D illustrate an example buffer 506 and various features of the example buffer 506. FIG. 5A illustrates a side view of a buffer 506, and FIG. 5B illustrates rear view of a buffer 506.

Buffers 506 may be provided proximate to the front or rear bumpers of a vehicle, and, in some embodiments, the buffer 506 may extend across the width of the safety mechanism. The buffer 506 may have a variety of shapes. In the embodiment illustrated in FIG. 5A, the buffer 506 defines a curvilinear shape, and this shape may be used in several embodiments.

The buffer 506 may also define one or more holes 508. In the embodiment illustrated in FIG. 5A, the buffer 506 has four holes. A bushing may be provided in the holes, and the bushing may be a swaged metal bushing.

Additionally, one or more patches 509 may be added to the buffer 506 in some embodiments to add additional protection against damage. This may be beneficial to provide additional protection only in certain locations where damage is likely to occur, or the patches 509 may be applied at all locations around the buffer 506 to provide additional protection for the buffer 506. Patches 509 may be secured to the buffer using an adhesive such as an epoxy. In some embodiments, the buffers 506 are configured to be easily replaced, repaired, and or repatched. This may extend the operating life of the safety mechanism.

In some embodiments, the buffer 506 may comprise flexible material such as rubber. However, the buffer 506 may have only rigid material in other embodiments. In the embodiment illustrated in FIG. 5A, the buffer 506 comprises several different pieces of rubber, and the different pieces of rubber may be joined using (1) an adhesive such as epoxy; and/or (2) rivets 507 that may be made of metal material. The buffer 506 may have only one piece of rubber in other embodiments.

FIG. 5B shows the rear the buffer 506 and the rivets 507 of the buffer 506. FIG. 5B also shows the treadle 502 and the drive line 504 connected to the buffer 506. The treadle 502 and the drive line 504 may extend through one of the holes 508 of the buffer 506. The treadle 502 may be installed at the desired hole 508 to provide the desired amount of leverage and rotation about the axis of the drive line 504. A cotter key 550 may be used to secure the buffer 506 and the treadle 502, and a retention nut 552 may be used to secure the buffer 506 and the drive line 504. However, the buffer 506 may be secured to the treadle 502 and the drive line 504 in a variety of other ways such as through the use of a nut, a pin, or another retention device.

A stop 554 may be provided at the interface between the drive line 504 and the buffer 506, and additional stops may be provided in or about the other holes 508. The buffer 506 may be mounted on the drive line 504 at a tenon 662 (see FIG. 6A). When the treadle 502 or buffer 506 are pushed in either direction (as indicated by the arrows in FIG. 5A), this may cause rotation about the tenon 662 and the axis of drive line 504. This rotation may cause a contact switch unit 870 (see FIG. 8B) to change state (e.g., from open to closed), sending an electric signal to apply the brakes in the associated vehicle. These features will be described further below.

The tenon 662 (see, e.g., FIG. 6A) may have one or more splines. Rotation of the buffer 506 will eventually cause contact between the buffer 506 and the spline. The spline may be rotationally fixed to the drive line 504. After the buffer 506 generates a sufficient force on the spline, this may cause rotation of the spline and the drive line 604. The tenon 662 may be joined to the remainder of the drive line 604 by flanges 668A.

Figure 5C:
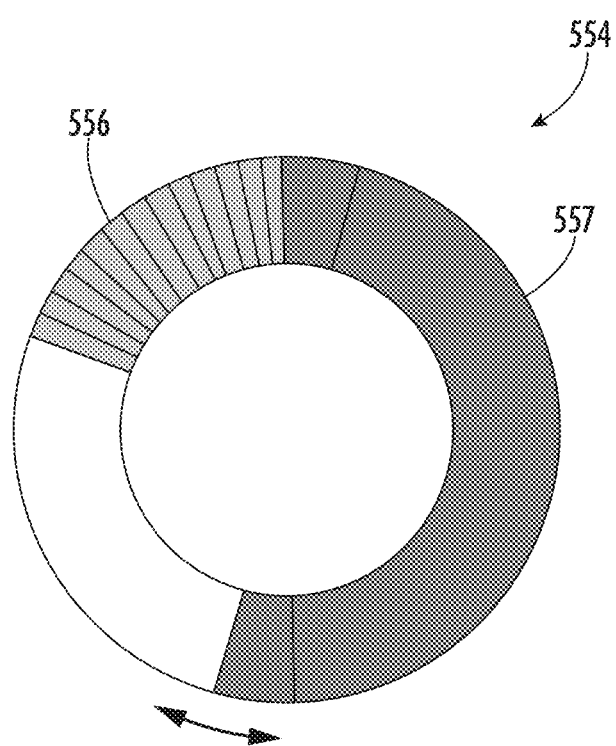
FIGS. 5C-5D illustrate schematic views of a stop in accordance with an embodiment of the invention.
Figure 5D:
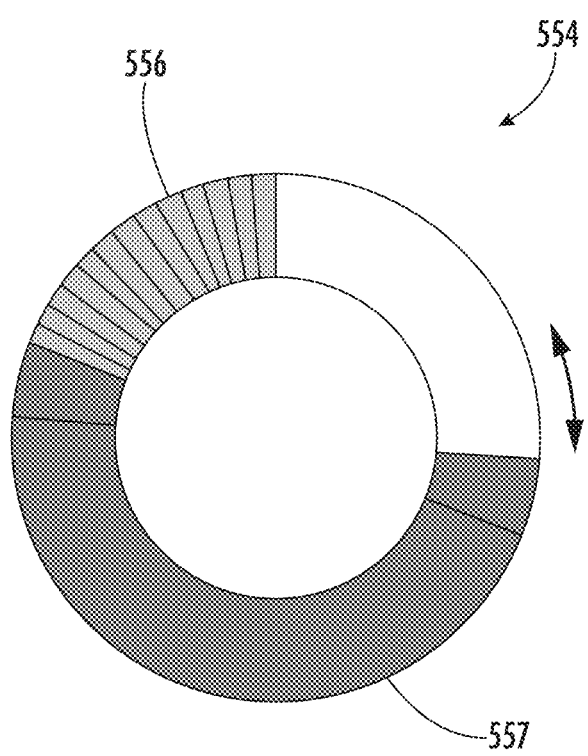

FIG. 5C-5D illustrate schematic views of a stop 554 that may be used in conjunction with a buffer 506. The stop 554 may generally possess a circular shape. A first element 556 and a second element 557 may be provided. In some embodiments, the first element 556 may be rotationally fixed to the drive line 504 and the second element 557 may be rotationally fixed to the buffer 506. In other embodiments, the first element 556 may be rotationally fixed to the buffer 506 and the second element 557 may be rotationally fixed to the drive line 504. Consequently, when the treadle 502 shifts and causes rotation of the buffer 506, the second element 557 may shift relative to the first element 556. This is demonstrated in FIGS. 5C and 5D, where the second element 557 has shifted relative to the first element 556. The stop 554 may be configured to only permit a certain amount of rotation. By way of example, in FIG. 5C, the first element 556 and the second element 557 may come in contact with each other to prevent rotation of the second element 557 in the counterclockwise direction relative to the first element 556. The stop 554 is integral to the buffer 506 in the illustrated embodiment. However, the stop 554 may be integral to the drive line 504 in some embodiments. In some embodiments, the stop 554 may be adjustable to permit a user to change the amount of rotation that may occur. This may be done by changing the size of the first element 556 or the second element 557, for example.

By providing stops 554 and splines, the buffer 506 may be implemented with some movement tolerance. This movement tolerance can be useful in situations, such as where the vehicle 290 (see, e.g., FIG. 2A) to which the safety mechanism 200 (see, e.g., FIG. 2A) is attached is travelling through rough terrain, where the vehicle travels over a speed bump, or to allow greater impacts. Rotation of the drive line 504 may activate the mechanism that applies the vehicle's brakes. Consequently, by providing greater movement tolerance for the drive line 504, inadvertent braking may be reduced. The stops 554 and the splines may also limit the amount of travel that the buffer 506 can rotate before turning the drive line 604 that actuates the brakes.

The buffers 506 may comprise a non-conductive material such as rubber in some embodiments. However, other materials may be used. For instance, in some embodiments, buffers 506 may be formed from used or recycled vehicle tires.

Figure 6A:
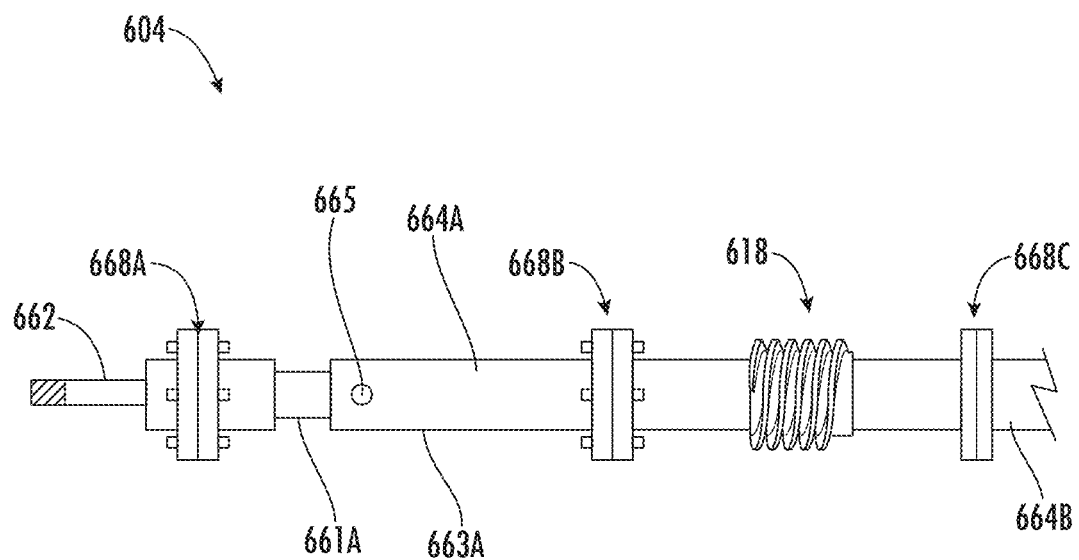
FIG. 6A illustrates a side view of a portion of a drive line in accordance with an embodiment of the invention.
Figure 6B:
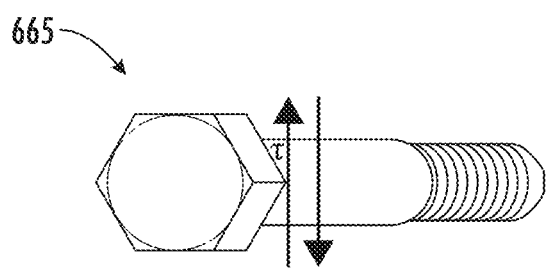
FIG. 6B illustrates a perspective view of a shear bolt that may be used in the drive line of FIG. 6A.

FIG. 6A illustrates a side view of a drive line 604. As discussed above, this drive line 604 may comprise a tenon 662. The drive line 604 may also comprise one or more telescoping shafts 664A, 664B, and a worm gear 618. Telescoping shaft 664A may comprise a female portion 663A and a male portion 661A that may extend into a cavity defined within the female portion 663A. Additionally, a bolt such as the shear bolt 665 illustrated in FIG. 6B may inserted through both the female portion 663A and the male portion 661A so that the two portions are rotationally fixed together. The shear bolt 665 may be a grade 5 shear bolt. The shear bolt 665 allows the buffer 506 (see, e.g., FIG. 5A) to rotate a certain amount, and the shear bolts 665 are designed to break before any damage may be caused to the internal mechanisms (e.g. the contact switch unit 770) or electronics. Shear bolts 665 will break after the buffers rotate a certain amount, allowing the outer portion of the telescopic shafts 664A, 664B to spin freely. The shear bolts 665 are beneficial in a high impact situations or at high speeds where the buffer would be electrically inactive. Even with the buffer being electrically inactive at these high speeds, contact with the safety mechanism 100 (see FIG. 1A) will still cause rotation of the buffers 106 (see FIG. 1A) and also cause the shear bolts 665 to break after a certain amount of rotation. In some embodiments, the shear bolts 665 can be replaced by a spring-loaded stop. Shear bolts 665 may also be utilized at other locations.

In some embodiments, the male portion 661A comprises a plurality of holes through which the shear bolt 665 may be received. Where this is the case, the telescoping shaft 664A may be adjusted as desired, and then the shear bolt 665 may be inserted to constrain the rotational movement and linear movement of the male portion 661A and the female portion 663A together. Flanges 668A, 668B, 668C may connect the various components of the drive line 604 together.

Figure 6C:
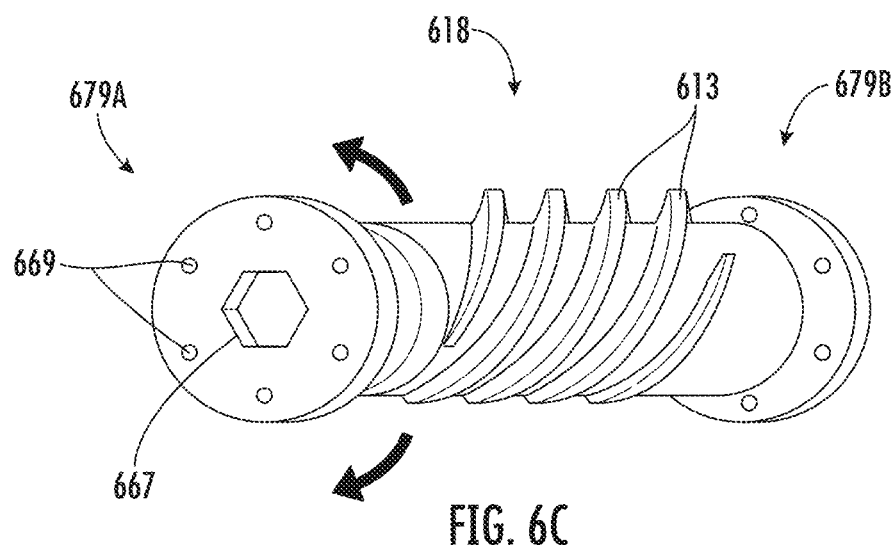
FIG. 6C illustrates a perspective view of a worm gear that may be provided in the drive line of FIG. 6A.

FIG. 6C illustrates a perspective view of a worm gear 618 that may be provided in a drive line 604 (see FIG. 6A) in accordance with an embodiment of the invention. As illustrated, the worm gear 618 may have teeth 613 that are configured to engage with a cam. The worm gear 618 may also have flanges 679A, 679B on each end. These flanges 679A, 679B may assist in connecting the worm gear 618 to other components within the drive line 604 (see FIG. 6A). One or more holes 669 may be defined within the flanges 679A, 679B, and these holes 669 may extend partially or fully through the flanges 679A, 679B. In the embodiment illustrated in FIG. 6C, six holes 669 are provided, but a different number may be used in other embodiments. The holes 669 may be used to assist in connection with other components in the drive line 604. A socket 667 may also be provided on the flanges 679A, 679B. The socket 667 may permit the worm gear 618 to be manually turned by a tool independent of the buffers 506 (see FIGS. 5A-5B). This allows the worm gear 618 to be tested by a technician independently of the buffers 506 (see FIGS. 5A-5B). The socket 667 may be centered upon the axis of rotation for the worm gear 618 in some embodiments, and the socket 667 may possess an appropriate size and shape to permit a socket wrench to engage the socket 667. The worm gear 618 may be provided inside of a housing 312 (see FIG. 3A) in some embodiments. The worm gear 618 and any associated flanges may be machined from a single steel billet for simplicity of manufacturing and replacement.

Figure 6D:
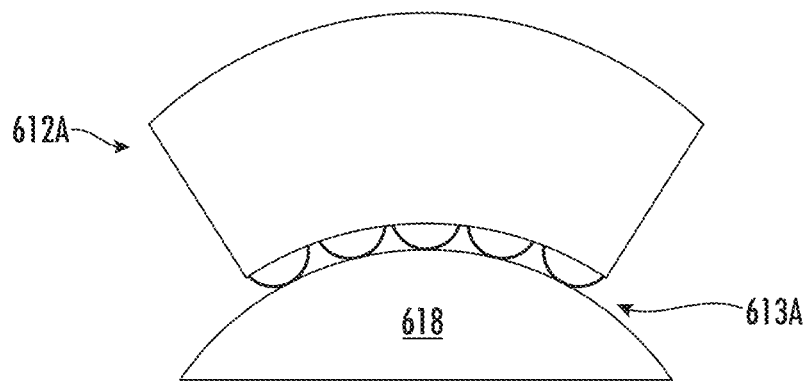
FIG. 6D illustrates a sectional view of a worm gear within a housing about the sectional line A-A of FIG. 3A in accordance with an embodiment of the invention.

FIG. 6D illustrates a schematic, sectional view of the distal portion 612A of a housing with a worm gear 618 provided therein. This sectional view is provided along the sectional line A-A illustrated in FIG. 3A. As illustrated, the distal portion 612A may comprise one or more bearings 614 that may reduce the amount of friction between the distal portion 612A and the worm gear 618. The distal portion 612A may also comprise non-conductive material so that the worm gear 618 and the bearings 614 may be electrically insulated from the tongue 305 (see FIG. 3A). The bearings 614 and electrically insulative material may be provided on either side of the worm gear 618, and the bearings 614 and electrically insulative material will preferably be provided at a portion of the worm gear 618 without teeth.

Figure 6E:
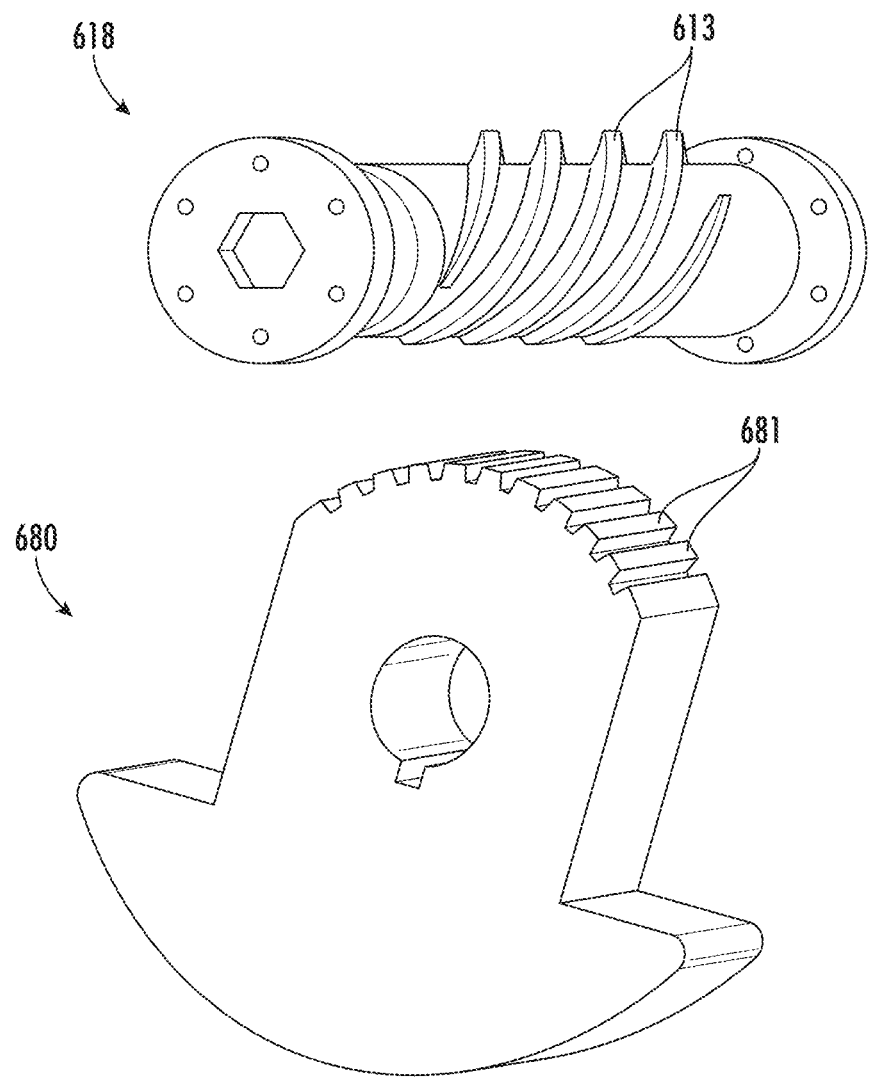
FIG. 6E illustrates a schematic view of a worm gear and an associated cam in accordance with an embodiment of the invention.

FIG. 6E illustrates a schematic view of a worm gear 618 engaging a cam 680 in accordance with an embodiment of the invention. As the worm gear 618 rotates, the teeth 613 mesh with the opposing teeth 681 of the cam 680, causing rotation of the cam 680. While the cam 680 is oriented in an upright position, the cam 680 may be oriented differently in other embodiments. The cam 680 may be oriented in a manner that will permit the teeth 613 of the worm gear 618 to engage with the teeth 681 of the cam 680. Further details regarding cams that may be used are discussed in reference to FIG. 8. While the teeth 681 of the cam 680 engage directly with the teeth 613 of the worm gear 618, one or more additional gears or other components may be provided between the two.

Figure 7A:
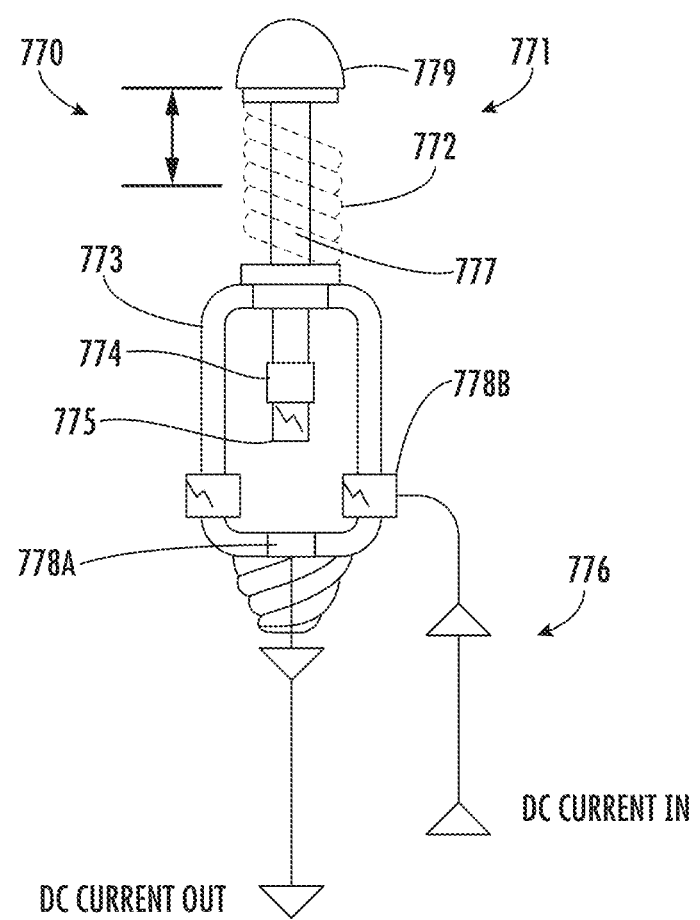
FIGS. 7A-7B illustrate schematic views of a contact switch unit in accordance with an embodiment of the invention.
Figure 7B:
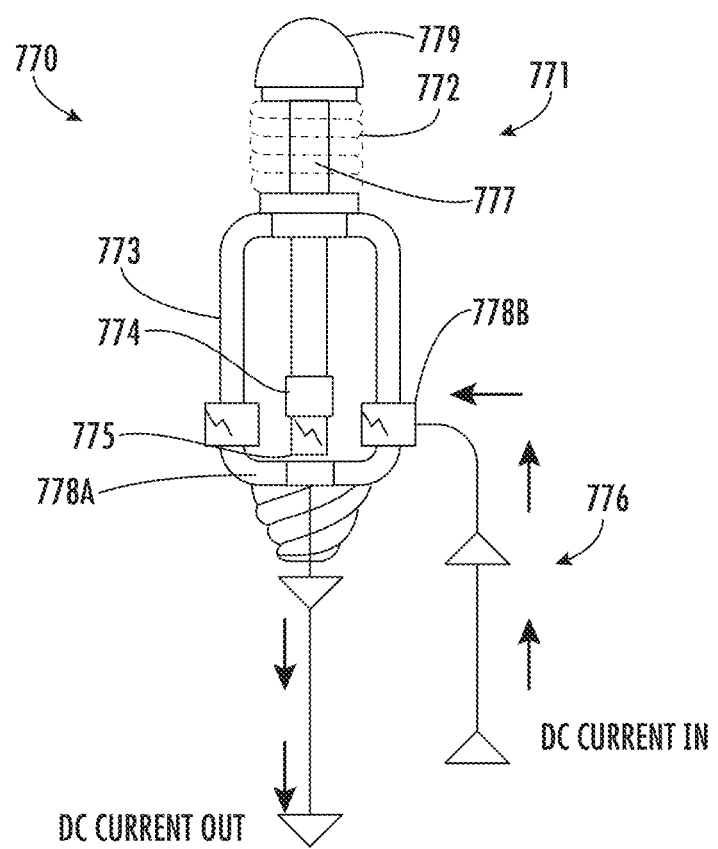

FIGS. 7A and 7B illustrate schematic views of a contact switch unit 770 in accordance with an embodiment of the invention. The contact switch unit 770 may have a plunger 771, and this plunger 771 may have a head portion 779 and a body portion 777.

The plunger 771 may be positioned appropriately by a spring 772. The spring 772 may wrap around the body portion 777 of the plunger 771 and urge the head portion 779 upwardly (when the contact switch unit 770 is oriented in an upright position as shown in FIG. 7A). A chamber 773 may be provided, and this chamber 773 may have non-conductive material that will provide insulation from electricity. The body portion 777 of the plunger 771 may extend into the chamber 773 through a recess in a wall of the chamber 773.

At a distal end of the body portion 777 of the plunger 771, a plunger contact 775 may be provided. The plunger contact 775 may include an electrically conductive material such as copper, and, in some embodiments, the plunger contact 775 may contain only electrically conductive material. As illustrated in FIG. 7B, the plunger contact 775 may be configured to form an electrical contact with the first housing contact 778A and the second housing contact 778B when the plunger 771 is urged downwardly and when the spring 772 is in a compressed state. Where this electrical contact occurs, the electrical circuit 776 may be closed, permitting electrical current to flow through the contacts and the electrical circuit 776. The plunger contact 775 may be sized and/or positioned within the housing 773 so that it will contact the first housing contact 778A and the second housing contact 778B when the plunger is being urged downwardly. However, when the plunger 771 is not being contacted (as illustrated in FIG. 7A), the spring 772 may urge the head portion 779 and rest of the plunger 771 upwardly, creating a gap between the plunger contact 775, the first housing contact 778A, and the second housing contact 778A so that no electrical contact is formed between the contacts. The second housing contact 778A may be provided on a sidewall of the housing 773, but it may be provided in other locations as well. In some embodiments, the second housing contact 778A may wrap around the perimeter of the housing 773. While the second housing contact 778B is illustrated as being uninsulated in external faces, the second housing contact 778B may be provided entirely within the housing 773 in some embodiments so that the housing 773 may provide electrical insulation. The contact switch unit 770 may also be provided within the removable covers 328 (see FIG. 3A) of the housing 312 (see FIG. 3A), and the removable covers and the housing 312 may have non-conductive or electrically insulative material.

A boot 774 may be provided proximate to the plunger contact 775 to assist in holding the plunger contact 775 in place. This boot 774 may comprise electrically insulative material. The boot 774 may provide electrical insulation so that any electricity flowing through the plunger contact 775 does not flow into other portions of the plunger 771.

Figure 8A:
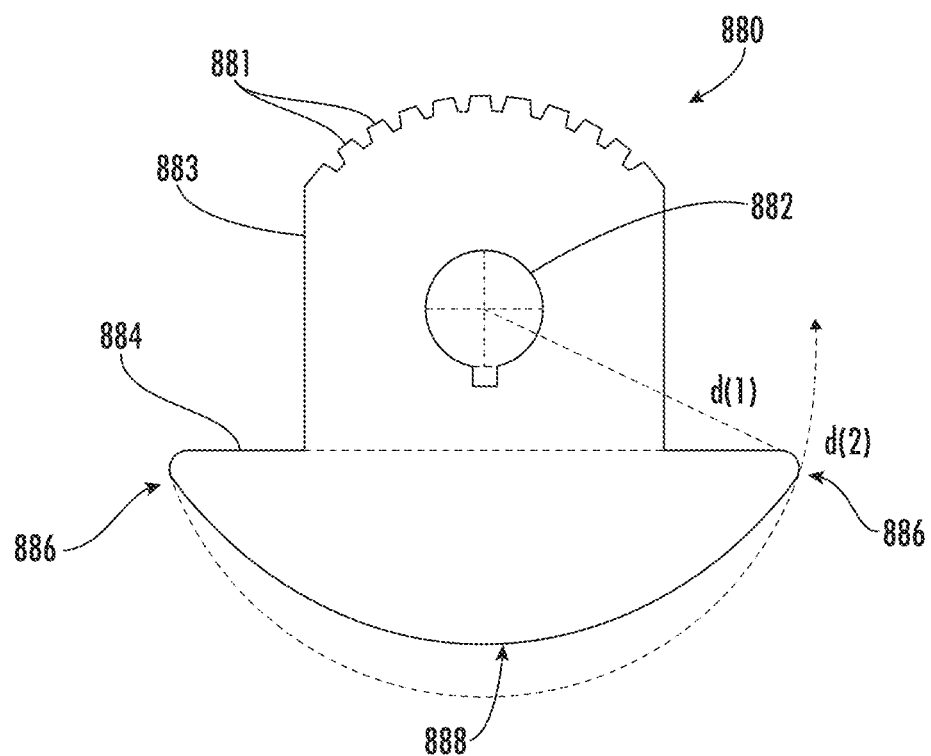
FIGS. 8A-8B illustrate schematic views of a cam in accordance with an embodiment of the invention.

FIG. 8A illustrates a schematic view of a cam 880. As illustrated, the cam 880 may take the form of a T-cam, but a variety of different types of cams may be used. The cam 880 may define a recess in the form of the keyway 882, and this keyway 882 may be configured to receive a rotating shaft. The cam 880 may be configured to rotate about this rotating shaft. The cam 880 may have a gear section 883 and a lobe 884. Teeth 881 may be provided on the cam 880 at the gear section 883 at a distance d(1) away from the center of a keyway 882. The teeth 881 may be configured to engage with the teeth 613 (see FIG. 6E) of the worm gear 618 (see FIG. 6E). In this way, movement of the buffers 506 (see FIGS. 5A, 5B) may generate rotation of the worm gear 618 (see FIG. 6E) and the engaged cam 880.

Figure 8B:
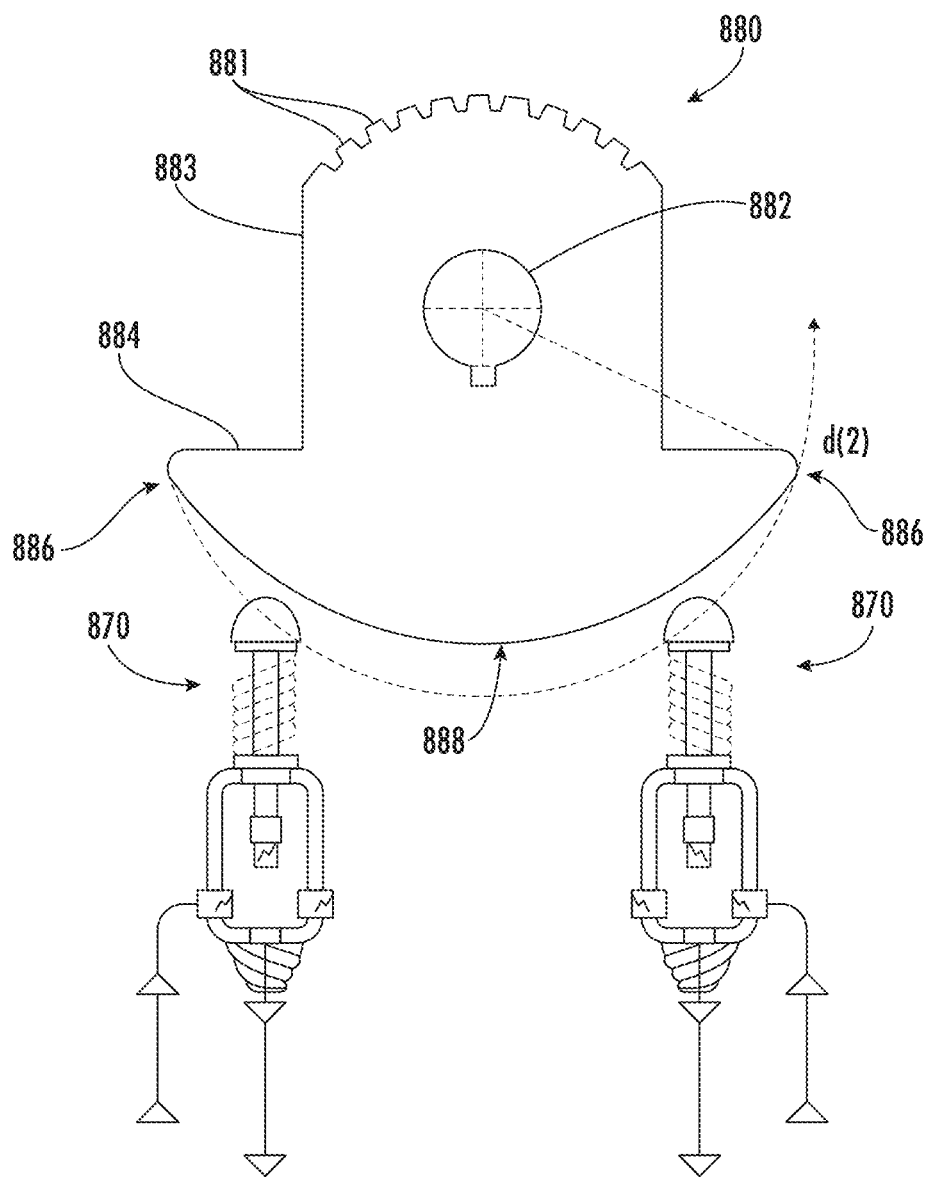

At the lobe 884, the outer surface of the lobe may have differing distances from the center of the keyway 882. For example, at the extreme ends 886 of the lobe 884, the outer surface may extend a distance d(2) away from the center of the keyway 882. By contrast, the center portions 888 of the lobe 884 may extend a lesser distance away from the center of the keyway 882. As such, when the contact switch units 870 are provided as illustrated in FIG. 8B, rotation of the cam 880 in either direction may cause one of the plungers 771 to be urged downwardly as shown in FIG. 7B and cause an electrical circuit to be formed in one of the contact switch units 870 so that brakes may be activated.

Contact switch units 870 may be provided on opposite sides of the lobe 884. While two contact switch units 870 are illustrated in FIG. 8B, one or more contact switch units may be used in other embodiments. For example, one contact switch unit 870 may be utilized, with the contact switch unit 870 being installed at a center portion 888 of the lobe 884 so that sufficient rotation of the cam 880 in either direction results in the plunger 771 (see FIG. 7A) being urged downwardly within the contact switch unit 870.

Additionally, while the cam 880 is illustrated and described as having a certain shape, other shapes may be used. The cam 880 may be fabricated from plates or flat-bars of 4140 steel, which may be beneficial for its strength, corrosion resistance, and cost-effectiveness. An electric discharge machine (EDM) may be used to cut or shape the steel, and the teeth 881 and the keyway 882 may be machined afterwards. The teeth 881 and keyway 882 may be formed through heat treatment and may comprise 4140 steel. While approaches are discussed herein for the creation of the example cam 880, the cam and other features on the cam may be formed in other ways.

In some embodiments, a linkage bar may be provided to permit control of multiple units. FIG. 9A illustrates a side view of a linkage bar 995 that may be used, and FIG. 9B illustrates a top view of the linkage bar 995. As illustrated in FIG. 9A, a safety mechanism 900A may be installed on the rear of a supply vehicle 990, and a safety mechanism 900B may be installed on the front of a work vehicle 994. The linkage bar 995 may be installed in one of the holes 508 (see FIG. 5A) within the buffers 906A, 906B. As illustrated in FIG. 9B, the linkage bar 995 may be a telescoping shaft that may be sized as desired. Where a linkage bar 995 is being used, the splines 662 (see FIGS. 6A) and/or the stops 554 (see FIGS. 5C-5D) may be adjusted to limit the amount of rotation that may occur. In some embodiments, as shown in FIG. 9B, joints 996 may be provided on linkage bar 995. Joints 996 may allow the vehicles to turn independently without bending the bar.

This linkage bar 995 may permit the control of multiple vehicles or units in the event that proximity sensors fail or in instances where poor visibility exists. This linkage bar 995 may be useful in emergency situations, with the linkage bar 995 being employed between buffers 906A, 906B so that automated or semi-automated vehicles can maintain a physically set distance. This linkage bar 995 can be especially useful in situations where a leader or follower vehicle is manned and the other vehicle has self-driving capability. The linkage bar 995 may be installed at the desired hole within a buffer 906A or 906B to provide the desired amount of leverage. In the embodiment illustrated in FIG. 9A, the supply vehicle 990 on the left has a greater leverage applied against the drive line than the work vehicle 994 on the right.

Figure 10A:
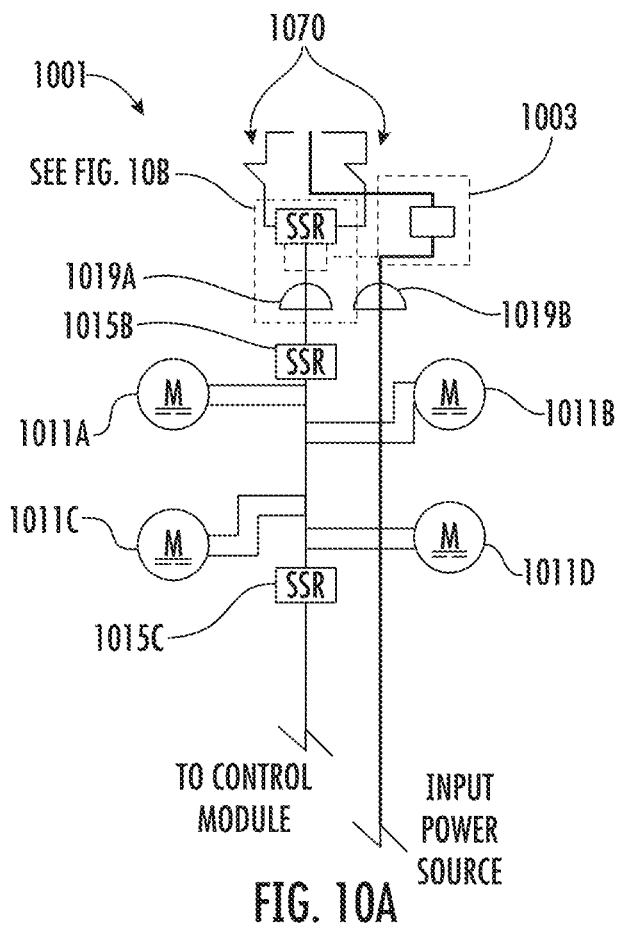
FIG. 10A is a schematic diagram of an electrical circuit for the safety mechanism in accordance with an embodiment of the invention.
Figure 10B:
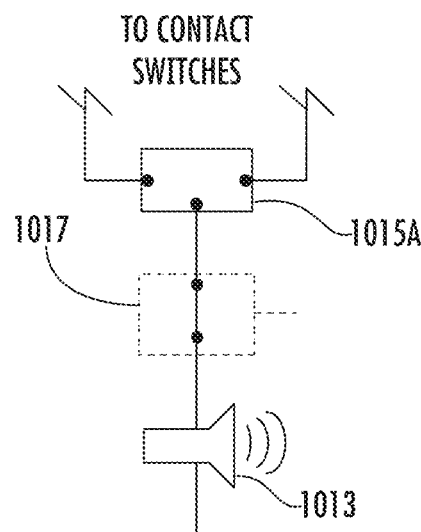
FIG. 10B is a detail view of a portion of the schematic diagram of FIG. 10A.
Figure 10C:
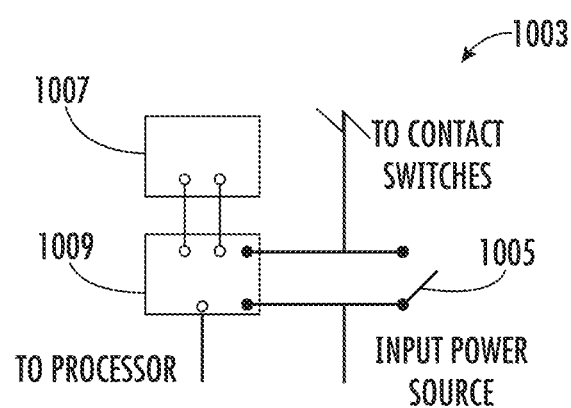
FIG. 10C is a detail view of a portion of the schematic diagram of FIG. 10A where a numerical relay system may be seen.

Various electrical components may be provided within the housing 312 (see FIG. 3A) and at other locations. FIG. 10A is a schematic diagram of an electrical circuit 1001 for the safety mechanism in accordance with an embodiment of the invention. Additionally, FIGS. 10B and 10C illustrate detail views of certain aspects of FIG. 10A according to various embodiments.

Input power for operating the brake circuit may be provided from an external source not shown in FIG. 10A. This input power may be supplied by the vehicle or by a piece of equipment that the safety mechanism is attached to. This may be done through a plug 425 (see FIG. 4A) or another plug or power input interface.

As input power enters the implement through the plug, the input power may reach the contact switches via a numerical relay system 1003 with logic processing. This numerical relay system 1003 according to one embodiment may be seen in greater detail in FIG. 10C. The numerical relay system 1003 may comprise a relay 1009, and a simple algorithm may be used to close the circuit when the measured speed is below a specified threshold, such as 10 mph or less. A GPS device 1007 may be provided to permit the measured speed to be determined, but other components may be used to determine the measured speed as well. The GPS device 1007 and the relay 1009 may be powered by the input power source. A processor may be provided within the numerical relay system 1003 or connected to the numerical relay system 1003, or the relay 1009 may receive instructions from another processor.

In some embodiments, a GPS device 1007 may be used to actuate the relay 1009. However, in some embodiments, an external speed input may be used to actuate the relay instead of the GPS device 1007. Where an external speed input is used to actuate the relay, this may be done using electromagnetic pulses gathered by a traditional speedometer. The electromagnetic pulses may be indicative of the speed, and the relay may close when the estimated speed is less than or equal to 10 mph.

Additionally, a manual toggle switch 1005 may be provided in the numerical relay system 1003 so that a user may manually permit or prevent power from being provided to the circuit, and this may be useful where a relay is not functioning properly. The manual toggle switch 1005 may be provided on the outside of a housing so that it may be readily accessible for a user.

Contact switch units 1070 may also be provided, and input power may be provided to these contact switch units 1070 when the numerical relay system 1003 is in a closed state. Once the contact switches have been closed on a live circuit, power is permitted to flow to the remainder of the circuit and to the brake actuator motors 1011A, 1011B, 1011C, 1011D. An audible alarm 1013 may be provided that can be sounded so that people nearby know that the brakes have been applied by the buffer implement (even from outside of the vehicle). A series of solid state relays 1015A, 1015B, 1015C may close to allow power from the buffer implement to reach the brake actuator motors 1011A, 1011B, 1011C, 1011D. Hitch plug connections 1019A, 1019B may also be included to complete the circuit.

An optional bypass relay 1017 may also be provided to permit constant voltage to flow after the contact switch units 1070 have switched to an opened state. This may permit voltage to flow for only a brief time, or it may permit voltage to flow for an extended period of time. This may be useful for electrical braking systems requiring continuous power to apply the brakes rather than a single electrical pulse.

Figure 11:
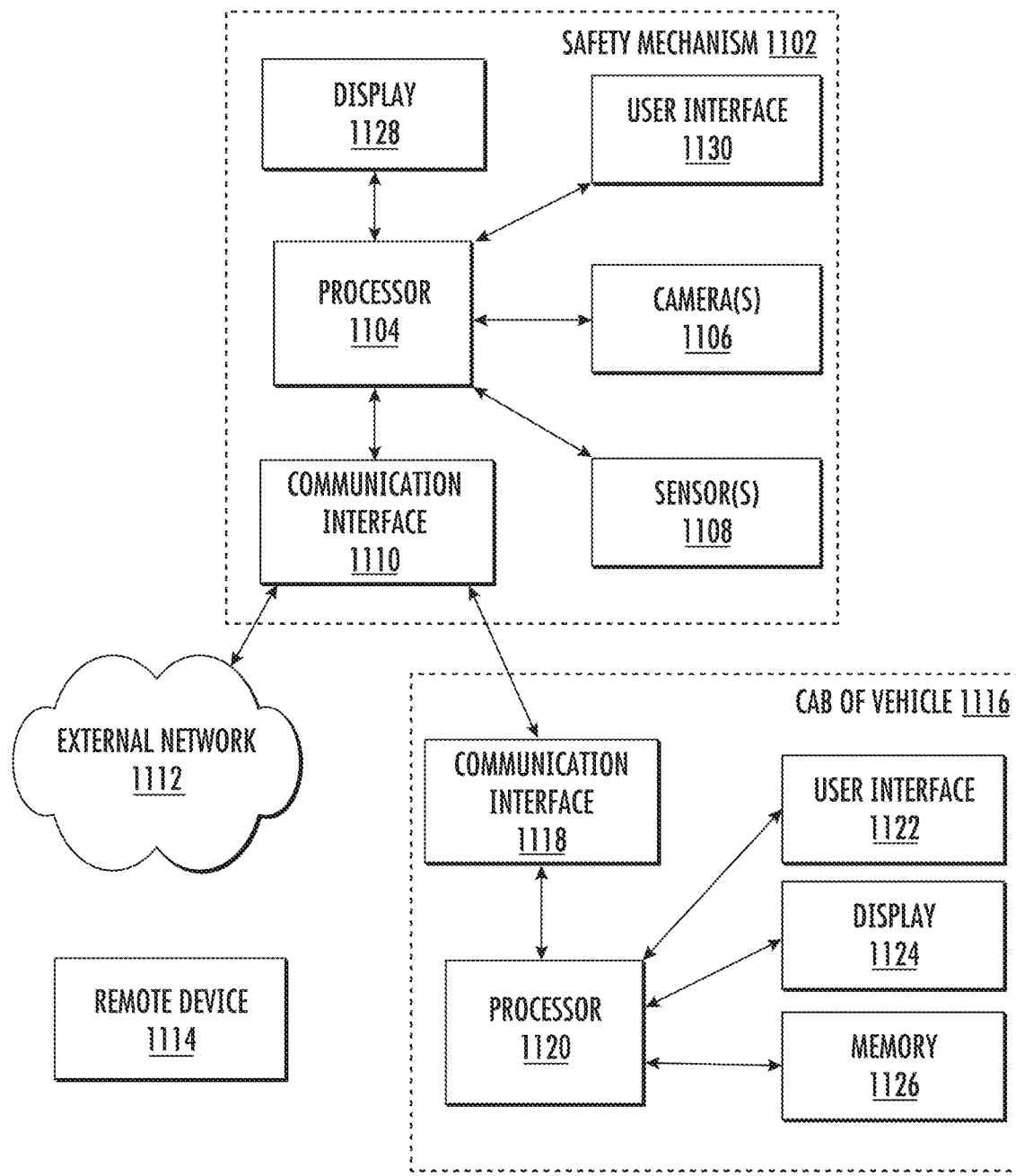
FIG. 11 illustrates a block diagram illustrating various hardware components of example systems in accordance with an embodiment of the invention.

FIG. 11 is a block diagram illustrating various hardware components of an example system in accordance with an embodiment of the invention. A safety mechanism 1102 may be provided with a processor 1104. One or more cameras 1106 and one or more sensors 1108 may be provided in the safety mechanism 1102, and these components may be connected to the processor 1104. The rear camera may send a live feed to a driver, to a site manager, and/or to others so that they may immediately see what activated the safety mechanism 1102. Various sensors 1108 may be used with the safety mechanism, including pressure sensors, proximity sensors, position sensors, temperature sensors, etc. In some embodiments, a display 1128 and a user interface 1130 may be provided at the safety mechanism 1102. The user interface 1130 may comprise one or more speakers and one or more microphones so that the individual who activated the safety mechanism 1102 may communicate with another person in the cab of the vehicle or at another location. Input may also be received at the user interface 1130 to alter the operation of the safety mechanism 1102 in some embodiments.

The safety mechanism 1102 may also comprise a communication interface 1110 that may serve as an interface with other components. The communication interface 1110 of the safety mechanism 1102 may form a connection with an external network 1112 to form a connection with a remote device 1114 such as a remote computer or a remote server.

The communication interface 1110 of the safety mechanism 1102 may also form a connection with a communication interface 1118 of a vehicle 1116 or a vehicle cab. In the cab of the vehicle 1116, the communication interface 1118 may be connected to a processor 1120. The processor may be connected to a user interface 1122, a display 1124, and memory 1126 to permit information about the safety mechanism 1102 to be readily reviewed and analyzed by a driver or another person in the cab of the vehicle. The user interface 1122 may also have one or more speakers and one or more microphones so that the user may communicate with another person located near the user interface 1130 of the safety mechanism 1102 or with another person located at a remote location. Input may also be received at the user interface 1122 to alter the operation of the safety mechanism 1102. The communication interfaces 1110, 1118 may comprise hardware necessary for wireless communication in some embodiments such as a transceiver, an antenna, etc.

Various connections are illustrated in FIG. 11. These connections may be direct connections in some embodiments, but the connections between two connected components may be indirect connections in other embodiments where one or more additional components are provided between the two connected components. Connections may be made in a variety of ways—for example, wired connections such as ethernet connections may be used, or wireless connections may be used through Wi-Fi, Wireless Local Area Network (WLAN), Bluetooth, Bluetooth Low Energy (BLE), or other short-range wireless connections. While various components are shown, certain components may be added or omitted, and components and/or connections may be rearranged or altered in different embodiments. For example, communication interfaces 1110 and 1118 may be removed in some embodiments, and wired connections may be used between the processors 1104 and 1120. As another example, communication interface 1118 may connect directly to the external network 1112 in some embodiments.

In some embodiments, other electrically actuated braking systems may be provided. For example, an electrically actuated pneumatic valve may be utilized that applies air brakes.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A safety mechanism for use with a vehicle, the safety mechanism comprising:
   a tongue configured for connection to the vehicle;

a drive line coupled with the tongue, the drive line having a longitudinal axis;

a sensor coupled with the drive line and configured for electrical communication with a braking system of the vehicle; and at least one buffer attached to the drive line and rotatable about the longitudinal axis of the drive line.

2. The safety mechanism of claim 1, wherein the sensor is actuatable in response to rotation of the drive line about the longitudinal axis.

3. The safety mechanism of claim 1, further comprising two buffers disposed at opposite ends of the drive line.

4. The safety mechanism of claim 3, further comprising a treadle coupled between the two buffers, the treadle having a treadle longitudinal axis oriented substantially parallel with the drive line longitudinal axis.

5. The safety mechanism of claim 2, wherein the drive line comprises a worm gear in operative engagement with a cam, wherein the cam is movable in response to rotation of the drive line.

6. The safety mechanism of claim 5, wherein the cam is a T-cam.

7. The safety mechanism of claim 6, wherein the cam comprises a lobe configured to engage the sensor in response to rotation of the cam.

8. The safety mechanism of claim 1, wherein the sensor comprises a contact switch.

9. The safety mechanism of claim 8, wherein the sensor comprises a movable plunger.

10. The safety mechanism of claim 9, wherein the sensor comprises a first electrical contact at a distal end of the plunger and a second electrical contact, wherein the plunger is movable between a first position at which the first electrical contact is not in electrical communication with the second electrical contact and a second position at which the first electrical contact is in electrical communication with the second electrical contact.

11. A safety mechanism for use with a vehicle, the safety mechanism comprising:

a drive line configured for connection to the vehicle, the drive line having a first longitudinal axis;

the drive line comprising at least one sensor, the at least one sensor configured to output a stop signal to a braking system of the vehicle in response to rotation of the drive line about the first longitudinal axis;

a pair of buffers disposed on opposite ends of the drive line and rotatable in response to rotation of the drive line about the first longitudinal axis; and a treadle extending between the pair of buffers, the treadle defining a second longitudinal axis, wherein the first and second longitudinal axes are substantially parallel.

12. The safety mechanism of claim 11, wherein the stop signal triggers an audible alarm.

13. The safety mechanism of claim 11, wherein the sensor outputs the stop signal when the drive line is rotated about the first longitudinal axis by a predetermined amount.

14. The safety mechanism of claim 11, wherein the sensor is inoperative when the vehicle's speed exceeds ten (10) miles per hour.

15. The safety mechanism of claim 11, further comprising one or more protective rollers disposed along the drive line and rotatable independently of the drive line.

16. A safety mechanism for use with a vehicle, the safety mechanism comprising:

a tongue configured for connection to the vehicle;

a drive line coupled with the tongue, the drive line defining a longitudinal axis;

wherein the drive line comprises at least one gear in operative engagement with a cam, wherein the cam is movable in response to rotation of the drive line about the longitudinal axis; and at least one buffer coupled with the drive line and rotatable about the longitudinal axis of the drive line.

17. The safety mechanism of claim 16, further comprising at least one spring configured to resist rotation of the drive line about the longitudinal axis.

18. The safety mechanism of claim 16, further comprising a bar having a proximal end and a distal end, wherein the bar's proximal end is coupled with the at least one buffer and wherein the bar's distal end is configured for coupling with a buffer of a safety mechanism coupled with another vehicle.

19. The safety mechanism of claim 18, wherein the bar comprises at least one joint, and wherein the bar's proximal end is pivotable at the joint relative to the bar's distal end.

20. The safety mechanism of claim 16, the drive line comprising at least two telescoping shafts.

* * * * *